(12) United States Patent
V et al.

(10) Patent No.: US 11,237,946 B2
(45) Date of Patent: Feb. 1, 2022

(54) ERROR FINDER TOOL

(71) Applicant: SAP SE, Walldorf (DE)

(72) Inventors: Sangeetha V, Bengaluru (IN); Praveen K R, Bangalore (IN); Kumar Vidya Bhushan, Bangalore (IN); Sebin Chacko, Bangalore (IN); Pooja Luthra, Bangalore (IN); Ronakkumar Patel, Bangalore (IN); Madhuri Jayanth Patil, Bangalore (IN); Shivam Shrivastav, Gwalior (IN)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 16/037,228

(22) Filed: Jul. 17, 2018

(65) Prior Publication Data

US 2019/0340104 A1 Nov. 7, 2019

(30) Foreign Application Priority Data

May 3, 2018 (IN) .............................. 201811016701

(51) Int. Cl.
*G06F 11/00* (2006.01)
*G06F 11/36* (2006.01)

(52) U.S. Cl.
CPC ...... *G06F 11/3636* (2013.01); *G06F 11/3624* (2013.01)

(58) Field of Classification Search
CPC ............. G06F 11/3636; G06F 11/3664; G06F 11/3466; G06F 11/302; G06F 11/3612; G06F 11/364; G06F 11/3656; G06F 11/362; G06F 11/3668; G06F 11/3624
See application file for complete search history.

(56) References Cited

U.S. PATENT DOCUMENTS

| | | | | |
|---|---|---|---|---|
| 6,345,295 B1* | 2/2002 | Beardsley | ........... | G06F 11/3495 709/223 |
| 7,055,070 B1* | 5/2006 | Uhler | ................. | G06F 11/3636 714/25 |
| 7,100,152 B1* | 8/2006 | Birum | ................ | G06F 11/3466 707/999.1 |
| 7,386,839 B1* | 6/2008 | Golender | ............. | G06F 11/366 717/131 |
| 8,132,159 B1* | 3/2012 | Lindahl | .............. | G06F 11/3636 717/128 |
| 8,225,282 B1* | 7/2012 | Massoudi | ................ | G06F 8/34 717/121 |
| 8,719,791 B1* | 5/2014 | MacPherson | ......... | G06F 9/4486 717/124 |
| 9,678,855 B2* | 6/2017 | Bates | .................. | G06F 11/3624 |
| 9,898,385 B1* | 2/2018 | O'Dowd | ................ | G06F 11/00 |
| 9,916,220 B2* | 3/2018 | Martynov | ........... | G06F 11/3636 |

(Continued)

*Primary Examiner* — Loan L. T. Truong
(74) *Attorney, Agent, or Firm* — Buckley, Maschoff & Talwalkar LLC (57) ABSTRACT

According to some embodiments, systems and methods are provided, comprising receiving at least one filter parameter in a filter parameter field and tracing features for tracing execution of an application, wherein the application includes a source code; executing the application while tracing the execution, based on the tracing features, to generate a trace; analyzing the generated trace; and determining a portion of the source code associated with a software bug based on the analysis. Numerous other aspects are provided.

18 Claims, 8 Drawing Sheets

(56) References Cited

U.S. PATENT DOCUMENTS

| | | | | |
|---|---|---|---|---|
| 9,946,628 B2* | 4/2018 | Andre | | G06F 11/3664 |
| 9,965,376 B1* | 5/2018 | Mola | | G06F 11/3688 |
| 10,073,755 B2* | 9/2018 | Shani | | G06F 11/3414 |
| 10,178,031 B2* | 1/2019 | Krajec | | G06F 11/3006 |
| 10,346,292 B2* | 7/2019 | Seto | | G06F 11/3466 |
| 10,565,511 B1* | 2/2020 | Cui | | G06N 3/082 |
| 2001/0042226 A1* | 11/2001 | Dzoba | | G06F 11/3664 |
| | | | | 714/39 |
| 2002/0087949 A1* | 7/2002 | Golender | | G06F 11/323 |
| | | | | 717/124 |
| 2002/0091977 A1* | 7/2002 | Mastro | | H04L 43/026 |
| | | | | 714/712 |
| 2003/0088854 A1* | 5/2003 | Wygodny | | G06F 11/3636 |
| | | | | 717/130 |
| 2004/0250164 A1* | 12/2004 | Ahmad | | G06F 11/364 |
| | | | | 714/30 |
| 2005/0055605 A1* | 3/2005 | Blumenthal | | G06F 11/362 |
| | | | | 714/13 |
| 2005/0223368 A1* | 10/2005 | Smith | | G06F 11/3636 |
| | | | | 717/128 |
| 2006/0026009 A1* | 2/2006 | Luhr | | G06Q 50/165 |
| | | | | 705/315 |
| 2006/0129993 A1* | 6/2006 | Belisario | | G06F 11/362 |
| | | | | 717/124 |
| 2007/0005323 A1* | 1/2007 | Patzer | | G01R 31/318357 |
| | | | | 703/14 |
| 2008/0098207 A1* | 4/2008 | Reid | | G06F 11/362 |
| | | | | 712/227 |
| 2008/0301717 A1* | 12/2008 | Chilimbi | | G06F 11/3664 |
| | | | | 719/329 |
| 2009/0158091 A1* | 6/2009 | Day | | G06F 11/0715 |
| | | | | 714/25 |
| 2010/0312776 A1* | 12/2010 | Burrichter | | G06F 16/2425 |
| | | | | 707/759 |
| 2011/0016207 A1* | 1/2011 | Goulet | | G06Q 10/06 |
| | | | | 709/224 |
| 2011/0023019 A1* | 1/2011 | Aniszczyk | | G06F 9/445 |
| | | | | 717/128 |
| 2011/0154296 A1* | 6/2011 | Marenco | | G06F 11/3636 |
| | | | | 717/128 |
| 2012/0036501 A1* | 2/2012 | Evensen | | G06F 11/3636 |
| | | | | 717/128 |
| 2012/0079459 A1* | 3/2012 | Bates | | G06F 11/3636 |
| | | | | 717/129 |
| 2012/0102465 A1* | 4/2012 | Bates | | G06F 11/362 |
| | | | | 717/125 |
| 2012/0222014 A1* | 8/2012 | Peretz | | G06F 11/3684 |
| | | | | 717/125 |
| 2012/0304010 A1* | 11/2012 | Opstad | | G06F 11/3676 |
| | | | | 714/34 |
| 2013/0091387 A1* | 4/2013 | Bohnet | | G06F 11/3636 |
| | | | | 714/38.1 |
| 2013/0318408 A1* | 11/2013 | Kilzer | | G01R 31/3177 |
| | | | | 714/724 |
| 2014/0033183 A1* | 1/2014 | Brown | | G06F 11/3636 |
| | | | | 717/131 |
| 2014/0068567 A1* | 3/2014 | Smith | | G06F 8/75 |
| | | | | 717/128 |
| 2014/0181767 A1* | 6/2014 | Kohavi | | G06F 30/398 |
| | | | | 716/106 |
| 2014/0181794 A1* | 6/2014 | Grawrock | | G06F 11/3636 |
| | | | | 717/128 |
| 2014/0282428 A1* | 9/2014 | Andre | | G06F 11/3636 |
| | | | | 717/128 |
| 2014/0344552 A1* | 11/2014 | Binns | | G06F 11/3476 |
| | | | | 712/208 |
| 2015/0121150 A1* | 4/2015 | Gamoneda | | G06F 11/3636 |
| | | | | 714/45 |
| 2016/0171640 A1* | 6/2016 | Ajith Kumar | | G09G 5/363 |
| | | | | 345/522 |
| 2016/0232139 A1* | 8/2016 | Brust | | G06F 11/3636 |
| 2016/0378637 A1* | 12/2016 | Gamble | | G06F 11/362 |
| | | | | 707/702 |
| 2017/0364353 A1* | 12/2017 | Adler | | G06F 8/70 |
| 2018/0101466 A1* | 4/2018 | O'Dowd | | G06F 17/40 |
| 2018/0121328 A1* | 5/2018 | Tsantilis | | G06F 11/3636 |
| 2018/0276562 A1* | 9/2018 | Woulfe | | G06F 11/3668 |
| 2019/0005234 A1* | 1/2019 | Klonowski | | G06F 11/36 |
| 2019/0065339 A1* | 2/2019 | Mola | | G06F 11/3476 |
| 2019/0121611 A1* | 4/2019 | Ashoori | | G06F 3/167 |
| 2019/0324891 A1* | 10/2019 | Mola | | G06F 11/3636 |
| 2019/0324892 A1* | 10/2019 | Gabryjelski | | G06F 11/3636 |
| 2019/0332519 A1* | 10/2019 | Myers | | G06F 11/3093 |

* cited by examiner

Source Scan for String: DATE - 3096 Hits

| Object Name | |
|---|---|
| Line Text | |

CL_CAL_DEF_CALLER_DYNAMIC======CM003
| 000001 | METHOD if_calendar_definition~get_date_in_first_week. |
| 000002 | CALL BADI badihandle->get_date_in_first_week |
| 000003 | CHANGING |
| 000004 | month = month |

CL_ISO_CALENDAR_DEFINITION======CM002
| 000001 | method IF_CALENDAR_DEFINITION~GET_DATE_IN_FIRST_WEEK. |
| 000002 | |
| 000003 | month = 1. |

CL_ABAP_MESSAGE_DIGEST=======CM001
| 000031 | RAISE EXCEPTION TYPE cx_abap_message_digest |
| 000032 | EXPORTING |
| 000033 | textid = cx_abap_message_digest=>kernel_outdated |
| 000034 | algorithm = if_algorithm. |
| 000035 | * Parameter length invalid |

CL_WFD_PROFILE=========CM009

FIG. 8

ERROR FINDER TOOL

CROSS-REFERENCE TO RELATED APPLICATION

This application claims the benefit of Indian Provisional Patent Application No. 201811016701, filed on May 3, 2018, entitled "ENHANCEMENT FINDER TOOL," which is incorporated herein by reference in its entirety for all purposes.

BACKGROUND

Organizations often receive software applications in a standard configuration. These organizations may enhance the standard configuration by modifying the computer code of the application to create an application that suits their specific business needs. However, execution of the modified code may result in the generation of error incidences. The error incidents may be a result of the enhancement itself, or a result of a bug in the standard software. Typically, the organization may consult the provider of the original software to analyze and/or resolve the errors. Determining the source of the error may be a time-consuming task, and the longer it takes to determine the source of the error, the longer it may take to resolve the error. Increased time in resolving the error may lead to customer dissatisfaction, long running issues with the software, high probability of Key Performance Indicator (KPI) violations, and a negative impact on support quality.

Systems and methods are desired which support efficient identification of errors in customer-modified software.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

When an organization executes a software application, they may encounter an error, and seek assistance from a software developer, who may be associated with a provider of the software application or another entity. The software developer may need to determine whether the error is the result of a software bug with the standard application, or an error with any modifications the organization has made to the standard application ("customer coding"). Conventionally, the developer may need to search all of the lines of code of the software application ("application"), to determine the source of the error. Determining the source of the error may be a time-consuming task, and the longer it takes to determine the source of the error, the longer it takes to resolve the error. Increased time in resolving the error may lead to customer dissatisfaction, long running issues with the software, high probability of Key Performance Indicator (KPI) violations, and a negative impact on support quality.

One or more embodiments provide for an error finder module that may provide a personalized identification of code sections that may be associated with the error. The error finder module may, in one or more embodiments, include several features allowing the developer to discover the source of the error more quickly than conventional methods for determining the source of the bug (e.g., scanning every line of code in an application). The features may include, for example, filters with respect to code, application components, software components, and packages; the developer-set/delete breakpoints in the application code; listings of all the tables used during execution of the application, and in particular corresponding to a given code call; SAP Fiori backend tracing; the ability to save a trace with applied filters; and the ability to scan a source code.

When a developer receives notification of an error with the application code, the developer may initiate execution of the error finder module via a first user interface. The developer may enter trace parameters into the first user interface display and begin a trace. As used herein, the term "trace" may refer to the steps an application performs to complete a task, including the tables accessed during execution of the task. This trace may be recorded, in one or more embodiments, in a call stack. In one or more embodiments, the developer may execute the application with the errors while simultaneously tracing the steps the application executes via the error finder module, and using the features of the error finder module to narrow the search for the error in the code.

Identification of the code sections associated with the error at an early stage may result in swift decision-making capability, and may provide for a faster analysis of the application, irrespective of whether the developer is familiar with the application. Other benefits of embodiments include: easy identification of consulting issues with respect to custom coding; start point for incidence analysis for any product maintenance team/weekend support/new joiners/ back office team; reduction in ping pong of incidences related to cross components; increase in efficiency; and a reduction in the processing time for any incident requiring technical analysis.

As used herein, a "software bug" or "application bug" may refer to an error, flaw, fault or failure in a computer program/application or system that causes the program to produce an incorrect or unexpected result or to behave in an unintended way.

Figure 1:
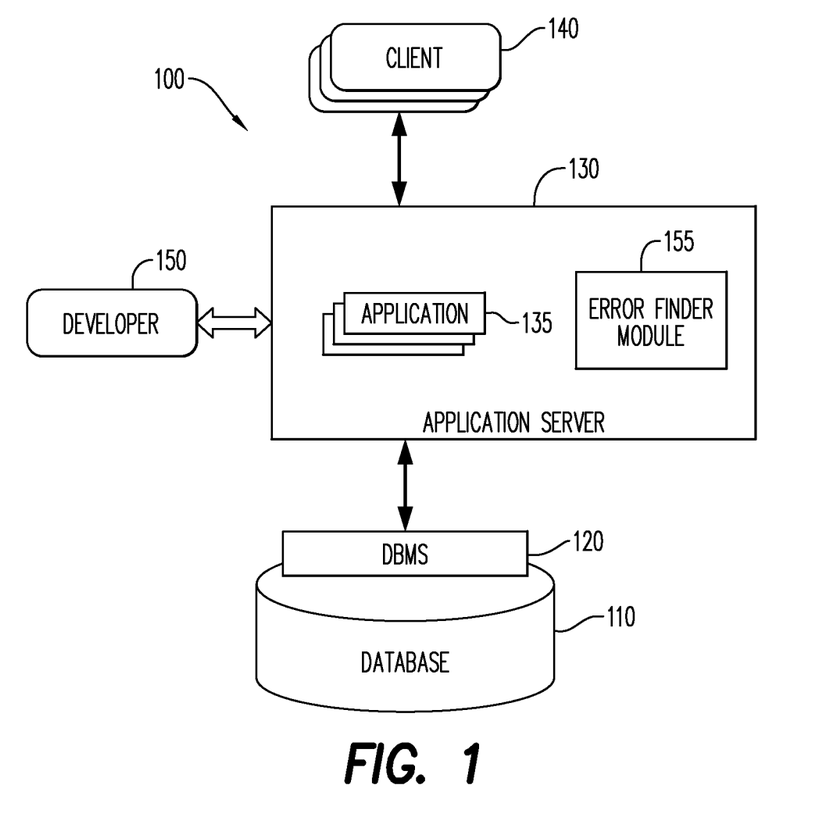
FIG. 1 is a block diagram of a system architecture according to some embodiments.

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135, clients 140, a developer 150, and an error finder module 155. Applications 135 may comprise server-side executable program code (e.g., compiled code, scripts, etc.) executing within application server 130 to receive queries from clients 140 and provide results to clients 140 based on data of database 110. A developer 150 may access the error finder module 155 executing within application server 130, to generate a trace 402 (FIG. 4) and determine a location of the error in the code.

Application server 130 provides any suitable interfaces through which the clients 140 and developer 150 may communicate with the error finder module 155 or applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by at least one of: applications 135 and the error finder module 155. For example, database 110 may store one or more tables accessed by the application 135 during execution thereof, and recorded as part of the trace.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Developer 150 and client 140 may comprise one or more individuals or devices executing program code of a software application for presenting and/or generating user interfaces to allow interaction with application server 130. Presentation of a user interface as described herein may comprise any degree or type of rendering, depending on the type of user interface code generated by application server 130.

For example, a client 140 or developer 150 may execute a Web Browser to request and receive a Web page (e.g., in HTML format) from a website application 135 of application server 130 via HTTP, HTTPS, and/or WebSocket, and may render and present the Web page according to known protocols. The client 140 or developer 150 may also or alternatively present user interfaces by executing a stand-alone executable file (e.g., an .exe file) or code (e.g., a JAVA applet) within a virtual machine.

FIGS. 2-7 include a flow diagram of a process 200 (FIG. 2) described with respect to an outward view of user interfaces according to some embodiments. Process 200 may be executed by application server 130 according to some embodiments. In one or more embodiments, the application server 130 may be conditioned to perform the process 200, such that a processor 810 (FIG. 8) of the server 130 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 300/400/600/700 may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interfaces 300/400/600/700 and may comprise a Web Browser, a standalone application, or any other application. Embodiments are not limited to user interface 300/400/600/700 of FIGS. 3, 4, 6, 7.

As used herein, the terms "developer" and "user" may be used interchangeably.

Figure 2:
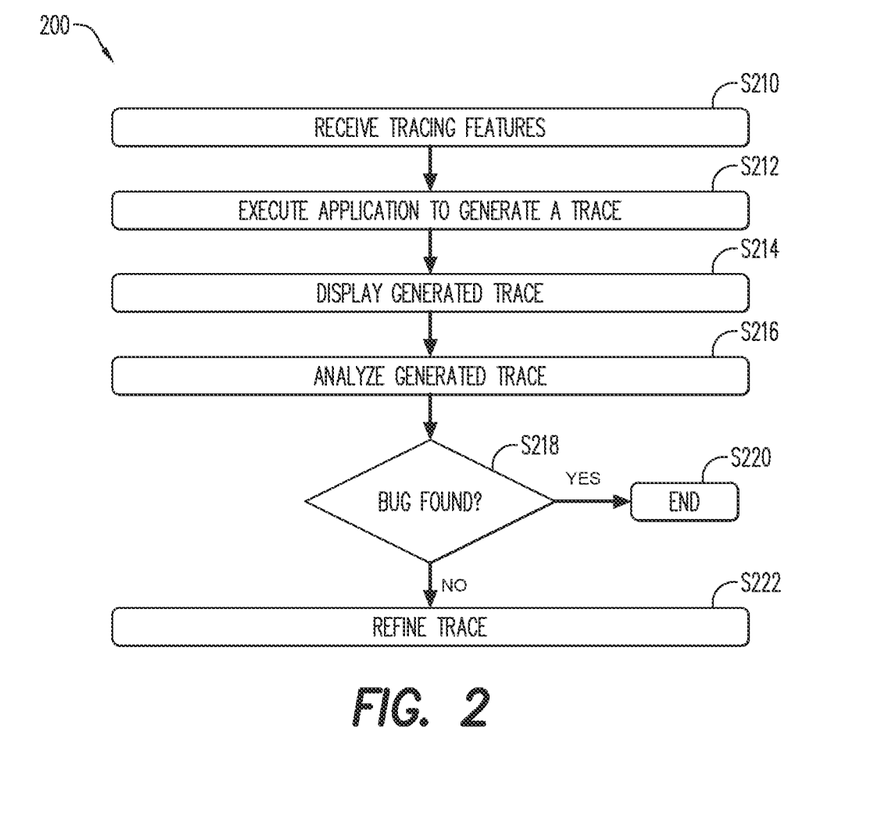
FIG. 2 is a flow diagram of a process according to some embodiments.

Initially, at S210, one or more tracing features 302 for tracing execution of an application 135 are received. In one or more embodiments, a user interface 300 (FIG. 3) may be provided by the error finder module 155. The user interface 300 may include one or more categories of tracing features 302. For example, tracing features 203 may include execution data 304, filter parameters 306 and trace parameters 308. Other suitable tracing features 302 may be included.

Figure 3:
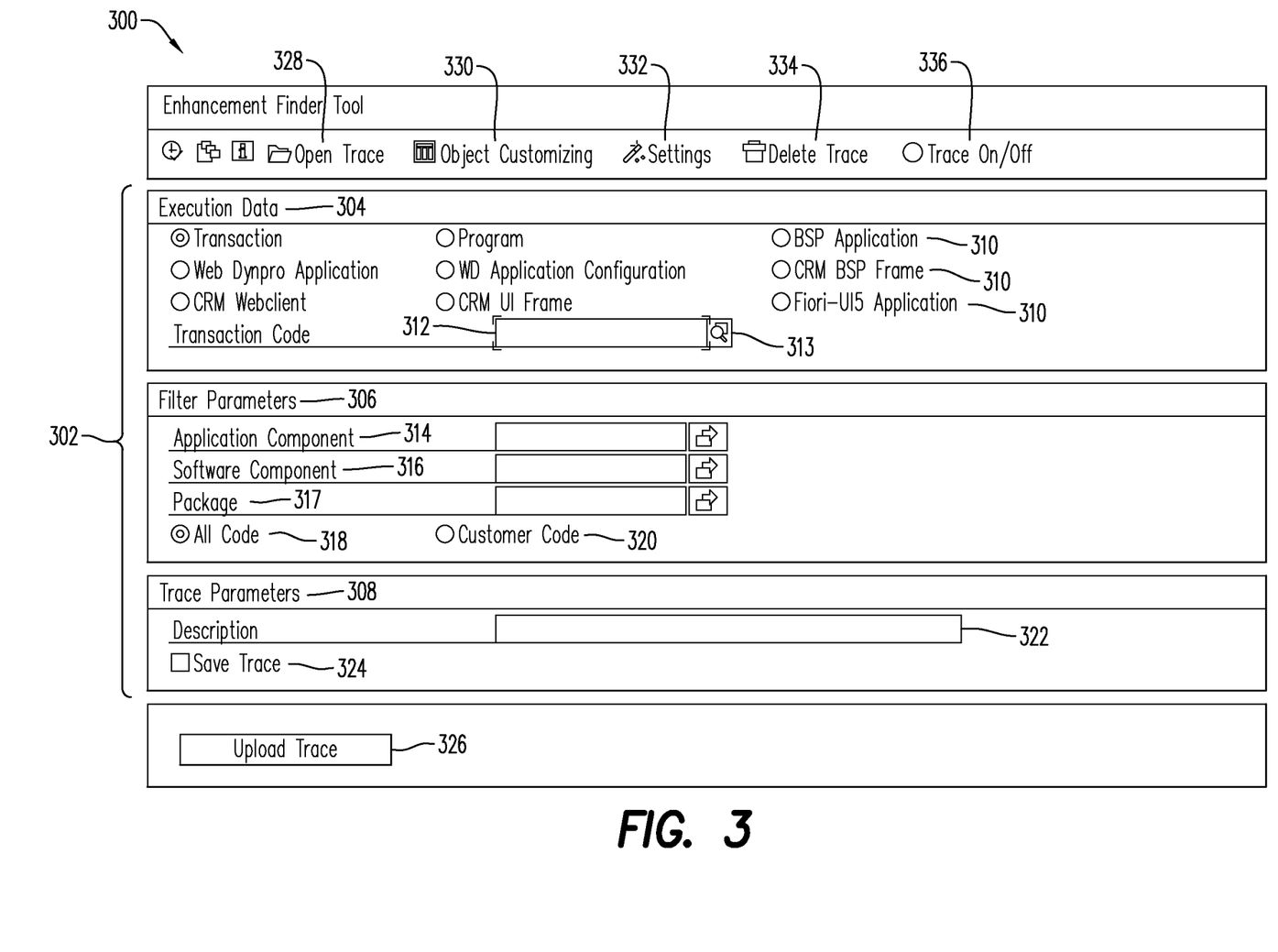
FIG. 3 is an outward view of a graphical interface according to some embodiments.

The execution data 304 may provide one or more elements 310 from which the trace will be recorded. It is noted that the elements 310 may be different application types supported by the system 100. Non-exhaustive examples of execution data elements 310 may include transactions, Web Dynpro Application, CRM Webclient, Program, WD Application Configuration, CRM UI Frame, BSP Application, CRM BSP Frame, Fiori-UI5 Application. In one or more embodiments, when the user selects one of the execution data elements, a user-entry field 312 associated with the selected execution data element 310, may be provided. For example, when the "transaction" execution data element 310 is selected, a "transaction code" user-entry field 312 may be provided. The user-entry field 312 may receive data to direct the error finder module 155 to the application with the at least one software bug that is being analyzed by the error finder module 155. For example, if the application being analyzed is for an e-commerce website, the user may select the respective application type and enter the transaction code/program/URL execution data element 310 and enter a website address in the user-entry field 312. In one or more embodiments, the user-entry field 312 may include a search assistant 313 to provide applications to select from.

The filter parameters 306 may be used to filter the trace 402 based on an Application component 314 (e.g., Accounting-General, Application Platform, Basis Component, Business Network Component, etc.), a software component 316 (e.g., SAP_BASIS, S4Core, etc.) and a package 317 (e.g., SBAC, SBCOMS, /SCMTMS/BO_COMMON, etc.). The filter parameters 306 may also include an "All Code" selector 318 and a "Customer Code" selector 320. In one or more embodiments, when the "All Code" selector 318 is selected, the trace may be executed for all of the code in the application 135, taking the other filters into account. In one or more embodiments, when the "Customer Code" selector 320 is selected, the trace may be executed for the customer coding sections only (e.g., the portions of code changed by the client), taking the other selected filters into account.

The trace parameters 308 may include a description data-entry field 322 to receive a description of the trace 402, when a user is going to save the trace 402. The UI 300 may also include a Saved Trace selector 324 to save the trace after execution thereof. It is noted that while radio buttons and check boxes may be shown here as selectors, the user interfaces shown herein are non-exhaustive examples, and any suitable selectors may be used.

An upload trace selector 326 may be used to upload a saved trace from a file, so that the other categories (execution data, filter parameters, etc.) may not need to be completed. In one or more embodiments, when the upload trace selector 326 is selected, the user may be prompted to select the file from their file system (which was received/downloaded earlier from elsewhere) and this file may be saved with the user-entered description. After the trace has been uploaded, via selection of the upload trace selector 326, the trace may be opened via selection of an open trace selector 328. It is noted that the upload trace selector 326 may be used when the trace is collected elsewhere and it is imported into this system 100; while a saved trace that is generated as described herein may be opened without uploading the trace.

The UI 300 may include other selectors, including but not limited to, an object customizing selector 330, a settings selector 332, a delete trace selector 334 and a Trace On/Off selector 336. In one or more embodiments the object customizing selector 330 may be used to select an object type (e.g., tables, domains, data types, etc.) for which the trace will be executed, to help in customizing the result list. For example, if the object type selected is "tables," when the trace is recorded, it may only record tables during that execution, and may not provide other objects. The settings selector 332 may be used to customize other settings associated with the trace (e.g., maintaining the RFC destination for notes search). The delete trace selector 334 may be used to delete the trace collected by the tracing features 302 (e.g., 324 and 326). The Trace On/Off selector 336 may be selected to start and stop execution of the trace. In one or more embodiments, after selection of the Trace On/Off selector 336, the user may be prompted to record the trace (e.g., in the case of BSP application, Webdynpro Application, CRM Application, FIORI Application) via selection of a "start recording" selector). In one or more embodiments, when the execution data elements 310 "Transaction" and "Program" are selected, the trace may stop/exit automatically after performing the task. For other execution data elements 310, the user may select the Trace On/Off selector 336 to stop recording the trace after the desired task has been completed (e.g., after reaching the error in the execution) and may collect the trace thereafter.

Turning back to the process 200, in S212, the application 135 being analyzed is executed to generate a trace. After the user has entered the trace features 302 or selected the saved trace, the Trace On/Off selector 336 may be selected to generate the trace. In one or more embodiments, for generation of the trace, the application 135 being analyzed may be executed, and the error finder module 155 may record the trace (i.e., all of the application calls to the functions, methods, and other connections accessed during execution of the application 135). In one or more embodiments, the trace 402 may be in the form of a call stack (e.g., a stack data structure that stores information about the active subroutines of an application/computer program). The trace 402 may be stored in any other suitable medium.

Figure 4:
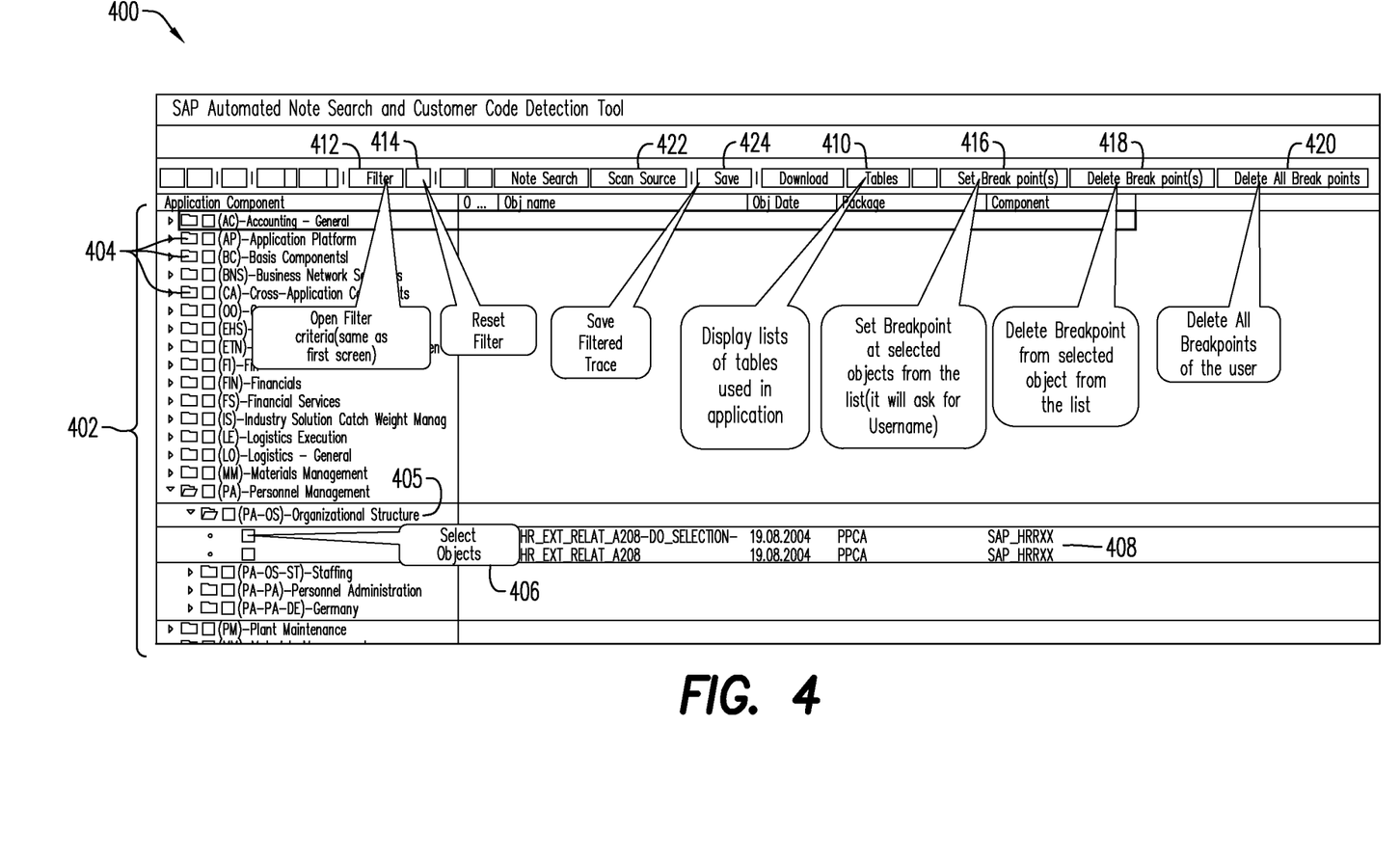
FIG. 4 is an outward view of a graphical interface according to some embodiments.
Figure 5:
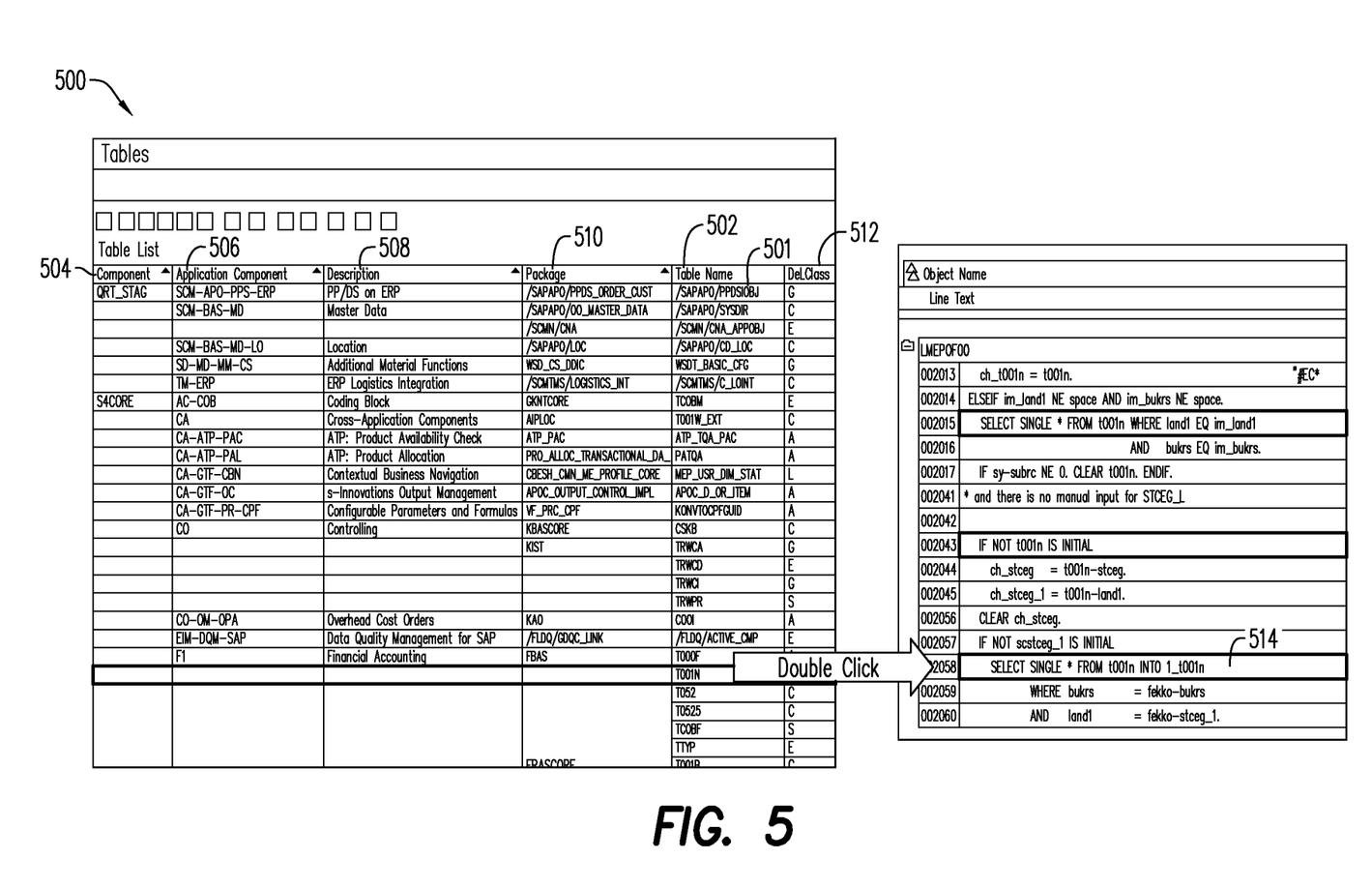
FIG. 5 is an outward view of a graphical interface according to some embodiments.
Figure 6:
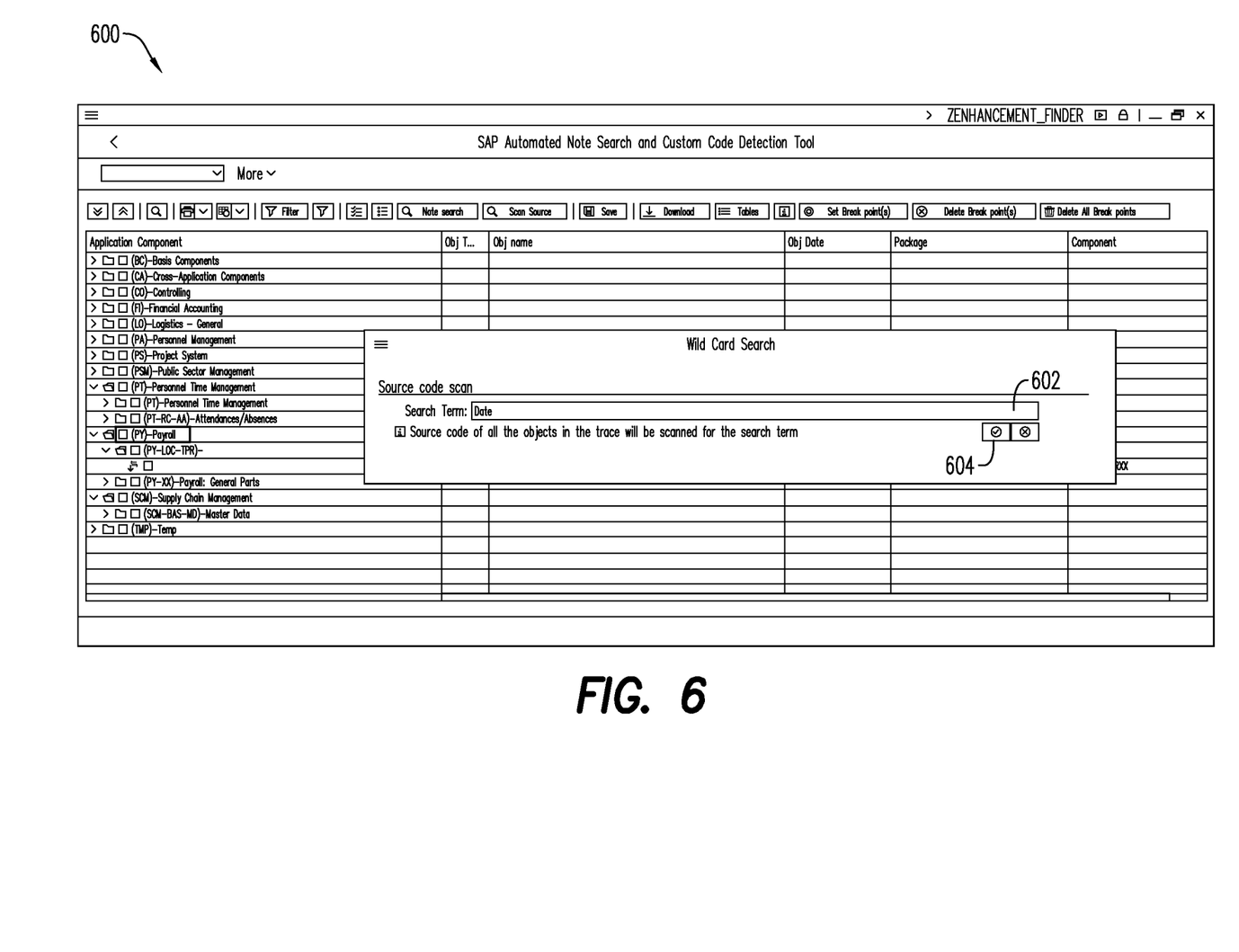
FIG. 6 is an outward view of a graphical interface according to some embodiments.
Figure 7:
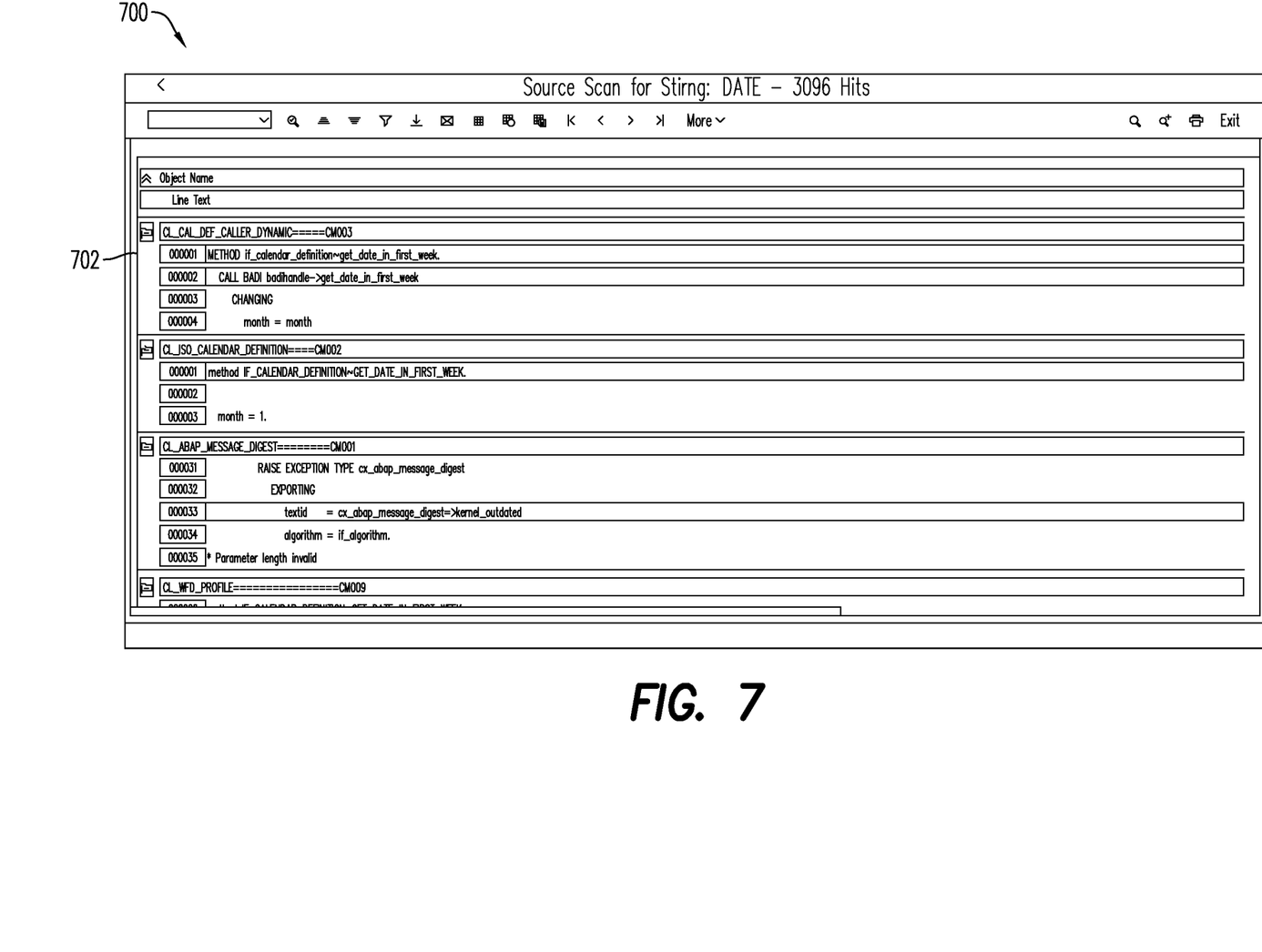
FIG. 7 is an outward view of a graphical interface according to some embodiments.

Then, in S214, the generated trace 402 is displayed on a trace results UI 400. The generated trace 402 may include a list of selectable application components 404, for example. The user may analyze the generated trace 402 in S216. For example, in one or more embodiments, the user may select one of the selectable application components 404. Selection of the application component 404 may allow the user to drill down to additional selectable items for each of the application components 404, including sub-components 405 (e.g., (PA-OS)-ORGANIZATIONAL STRUCTURE, (PA-OS-ST)-STAFFING), and selectable objects 406, which may provide the different functions that are part of the trace. Selection of an object 406 may cause additional data 408 related to the object to be displayed in the trace results US 400.

In one or more embodiments, the user may select the tables selector 410 to display a list of tables 500 (FIG. 5) accessed by the application 135 during execution thereof and generation of the trace 402. In one or more embodiments, for each table 501 accessed, identified by a table name 502, for example, the list of tables 500 may additional data including, but not limited to, a component 504, an application component 506, a description 508, a package 510, and a del.class 512. As used herein, the component 504 may refer to the software component, and del.class may denote "to delivery class." The user may then select the table name 502 to display application code 514 where the table is used.

Next, the user may determine in S218 whether they can identify and/or determine a portion of the code responsible for the bug. If in S218, they can determine the portion of the code responsible for the bug, the process ends in S220. When the process ends, the user may at least one of: provide a solution to fix the software bug, and a notification of the location and/or nature of the software bug to any suitable party (e.g., client, another system, etc.).

When in S218, the user cannot determine a portion of the code responsible for the bug, the process 200 may proceed to S222, and the trace 402 is further refined to better determine the area of code responsible for the software bug. For example, the user may select a filter selector 412, which may return the user to the UI 300 shown in FIG. 3, with the trace features 302 from the just-executed trace selected and the user may select different trace features 302, and re-run the trace. The user may select a re-set filter selector 414, which may return the user to the UI 300 shown in FIG. 3, with no trace features 302 selected.

As another example of further refining the trace, the user may select an object 406 from the component list 404, and then may select a set break point selector 416. It is noted that the breakpoint may be selected directly, without first opening the code. Conventionally, the breakpoint may be set by navigating to the code for each object and setting the breakpoint individually. In one or more embodiments, by selecting a folder from the object list and pressing the break point selector 416, the breakpoints may be set collectively for all the sub-objects, without navigating to the code, which makes the process easier to execute and thereby increases efficiency. It is noted that a trace 402 may include a lot of components, and a developer may be responsible for only one component. As such, the developer may set the breakpoint for that component to be able to narrow the analysis. Alternatively, the developer may set the breakpoint for any component they want to analyze further as the possible source of the bug. For example, when a modification is done by the client, the breakpoint may be set to this specific component. In one or more embodiments, when the set break point selector 416 is selected, the user may be prompted for a username to associate with the breakpoint. In one or more embodiments, a breakpoint applies for a particular username only. As used herein, a "breakpoint" may refer to a point in the code from where one can start the application debugging. After the breakpoint is set, the application 135 is re-executed (the browser may be refreshed, for example) the application debugger will open up at the breakpoint. It is noted that the purpose of the breakpoint is not to trace, but to analyze the execution. The user may also select a delete break point selector 418 to remove the break points from the selected objects in the component 404, or the user may select a delete all break points selector 420 to remove all break points of the user. It is noted that the delete break point selector 418 may delete breakpoints of the selected items from the result list, including breakpoints that may have been set in manner other than selection of the set break point selector 416. It is also noted that the delete all break points selector 420 may delete everything set for this particular user in the session.

In one or more embodiments, the user may select a scan source selector 422 to search within the collected trace, and may display the use of a keyword within the code lines of the collected trace. Selection of the scan source selector 422 may generate a scan source user interface 600 (FIG. 6), where the user may enter key words in a search term user-entry field 602. For example, the user may enter the term "Date" and then select an execute selector 604. The error finder module 155 may then search for that term in the recorded trace (trace results). Next, the source code (used within the trace results) 702 where they keyword "Date" is used is displayed, as shown for example in UI 700 in FIG. 7. The keyword may be highlighted or otherwise indicated on the source code. The user may then select (e.g., click) any of the highlighted lines to navigate to that particular code.

In one or more embodiments, the user may save a filtered trace via selection of a save filtered trace selector 424. The saved trace may be used by developers as a reference, for example.

Figure 8:
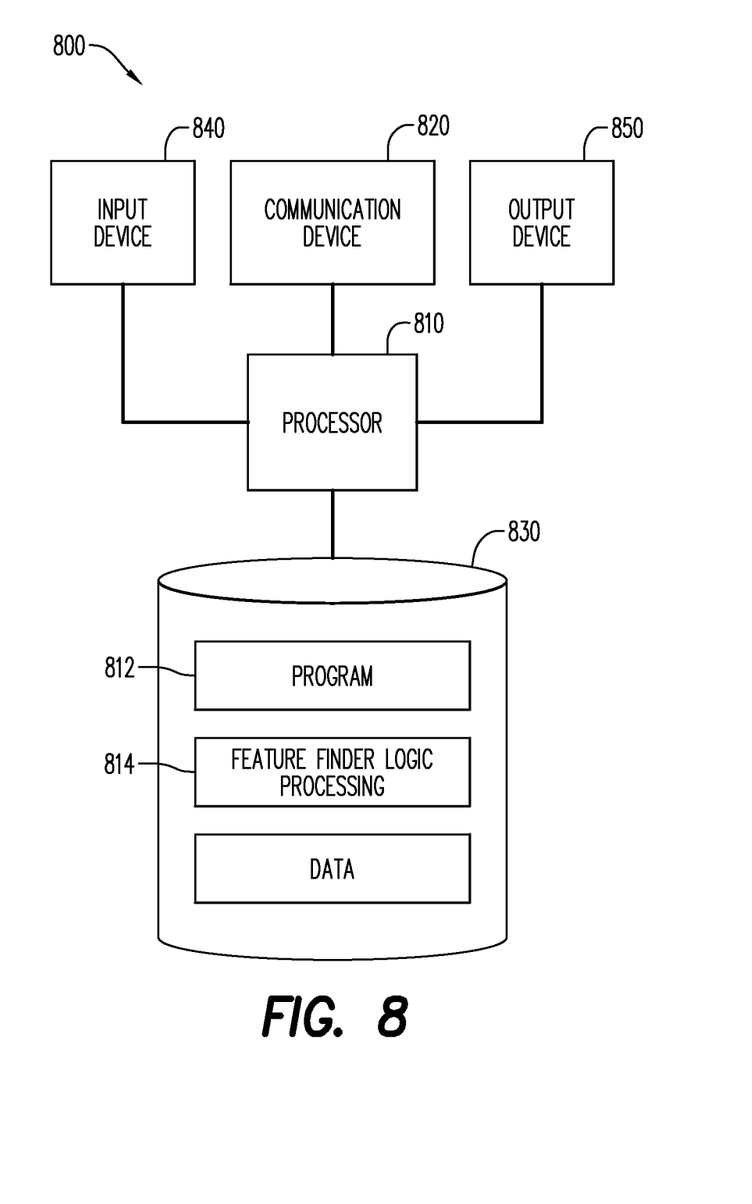
FIG. 8 is a block diagram of a system according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other unshown elements according to some embodiments.

Apparatus 800 includes error finder processor 810 operatively coupled to communication device 820, data storage device 830, one or more input devices 840, one or more output devices 850 and memory 860. Communication device 820 may facilitate communication with external devices, such as application server 130. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or feature finder platform logic 814 for controlling the processor 810. The processor 810 performs instructions of the programs 812, 814, and thereby operates in accordance with any of the embodiments described herein, including but not limited to process 200.

The programs 812, 814 may be stored in a compressed, uncompiled and/or encrypted format. The programs 812,

814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
providing a user interface adapted to receive tracing features prior to tracing execution of an application;
receiving tracing features at the user interface, the tracing features including at least one filter parameter and at least one of execution data and a trace parameter, wherein the at least one filter parameter is received in a filter parameter field of the user interface, wherein the execution data is an application type, the trace parameter is a description of a saved trace, and the filter parameter is at least one of an application component, a software component, a package component, an all code parameter and a customer code parameter, wherein the at least one filter parameter and the at least one of execution data and the trace parameter are adapted to restrict subsequent execution of a trace;
wherein any of the received tracing features identifies one or more sections of code in which to execute the subsequent trace, the trace comprising one or more steps the application performs to complete a task, wherein the application includes a source code;
executing the application while tracing the execution, the execution based on the received at least one filter parameter and the received at least one of execution data and trace parameter, to generate the trace;
analyzing the generated trace, wherein analyzing the generated trace further comprises selecting a list of selectable application components to display the trace results and determining the portion of code responsible for the software bug;
refining the trace when the portion of code responsible for the bug cannot be determined, wherein refining the trace comprises: selecting, from a component list, an object providing a function of the trace, wherein selection of the object sets a breakpoint which opens a debugger to analyze the execution, wherein setting the breakpoint prompts for a username to be associated with the breakpoint; and re-executing the application after the breakpoint is set.

2. The method of claim 1, further comprising:
displaying the generated trace on a user interface prior to analyzing the generated trace.

3. The method of claim 1, wherein refining the generated trace further comprises:
selecting the breakpoint in the generated trace, wherein the breakpoint is a point in the code to begin application debugging; and
opening, via re-execution of the application, an application debugger at the selected breakpoint.

4. The method of claim 2, wherein the generated trace includes an application component category providing one or more traced application components.

5. The method of claim 4, wherein analyzing the generated trace further comprises:
displaying a list of one or more tables used in the execution of the one or more traced application components; and
displaying application code where the table is used.

6. The method of claim 1, further comprising:
searching for a keyword in the generated trace.

7. A system comprising:
a display;
a memory storing processor-executable steps; and
an error finder processor to execute the processor-executable process steps to cause the system to:
present a user interface on a display, the user interface including one or more user-entry fields to receive tracing feature data prior to tracing execution of an application;
receive tracing feature data at the user interface for tracing subsequent execution of the application, wherein the application includes a source code, and wherein the received tracing feature data identifies one or more sections of code in which to execute a subsequent trace, the trace comprising one or more steps the application performs to complete a task, wherein the tracing feature data includes at least one filter parameter and at least one of execution data and a trace parameter, wherein the execution data is an application type and a trace parameter is a description of a saved trace, and the at least one filter parameter and the at least one of execution data and the trace parameter are adapted to restrict subsequent execution of the trace;
execute the application while tracing the execution, the execution based on the received tracing feature data, to generate the trace;
select a list of selectable application components to display the trace results, display the generated trace on the user interface, and determine the portion of the code responsible for the software bug;
refine the trace when the portion of the code responsible for the bug cannot be determined, wherein refining the trace comprises:
receiving selection of an object providing a function of the trace, wherein selection of the object sets a breakpoint in the generated trace to analyze the displayed generated trace, wherein the breakpoint is a point in the code to begin application debugging and selection of the object opens a debugger to analyze the trace, wherein setting the breakpoint prompts for a username to be associated with the breakpoint; and re-executing the application after the breakpoint is set.

8. The system of claim 7, further comprising processor-executable process steps to cause the system to:

open, via re-execution of the application, an application debugger at the selected breakpoint prior to determining the portion of the source code associated with the software bug.

9. The system of claim 7, wherein the generated trace includes an application component category providing one or more traced application components.

10. The system of claim 9, wherein analysis of the generated trace further comprises processor-executable process steps to cause the system to:

display a list of one or more tables used in the execution of the one or more traced application components; and display application code where the table is used.

11. The system of claim 7, further comprising a scan source selector to search for a keyword in the generated trace.

12. A non-transitory computer-readable medium storing program code, the program code executable by a computer system to cause the computer system to:

present a user interface on a display, the user interface including one or more user-entry filter parameter fields to receive one or more filter parameters and one or more user-entry fields to receive tracing feature data prior to execution of an application;

receive tracing feature data at the user interface, the tracing features including at least one filter parameter and at least one of execution data and a trace parameter, wherein the execution data is an application type, the trace parameter is a description of a saved trace, and the at least one filter parameter is at least one of an application component, a software component, a package component, an all code parameter and a customer code parameter wherein the at least one filter parameter and the at least one of execution data and the trace parameter are adapted to restrict subsequent execution of a trace;

wherein any of the received tracing feature data identifies one or more sections of code in which to execute the subsequent trace, the trace comprising one or more steps an application performs to complete a task, wherein the application includes a source code;

execute the application while simultaneously tracing the execution, the execution based on the received at least one filter parameter and the received at least one of execution data and trace parameter, to generate the trace;

display the generated trace on the user interface;

analyze the displayed generated trace, wherein analyzing the generated trace further comprises selecting a list of selectable application components to display the trace results and determining the portion of code responsible for the software bug;

refine the trace when the portion of code responsible for the bug cannot be determined, wherein refining the trace comprises:

selecting, from a component list, an object providing a function of the trace, wherein selection of the object sets a breakpoint which opens a debugger to analyze the execution, wherein setting the breakpoint prompts for a username to be associated with the breakpoint; and re-executing the application after the breakpoint is set.

13. The medium of claim 12, wherein analysis of the generated trace further comprises program code to cause the system to:

select the breakpoint in the generated trace, wherein the breakpoint is a point in the code to begin application debugging; and open, via re-execution of the application, an application debugger at the selected breakpoint.

14. The medium of claim 12, wherein the generated trace includes an application component category providing one or more traced application components.

15. The medium of claim 14, wherein analysis of the generated trace further comprises program code to cause the system to:

display a list of one or more tables used in the execution of the one or more traced application components; and display application code where the table is used.

16. The medium of claim 12, further comprising a scan source selector to search for a keyword in the generated trace.

17. The method of claim 1, wherein receipt of the customer code parameter is adapted to restrict the trace to one or more portions of code changed by a customer.

18. The method of claim 3, wherein selecting the object automatically sets the breakpoint for any sub-object of the selected object.

* * * * *